(12) United States Patent
Guo et al.

(10) Patent No.: US 10,367,943 B2
(45) Date of Patent: Jul. 30, 2019

(54) ELECTRONIC SYSTEM WITH GROUP LOCATION MECHANISM AND METHOD OF OPERATION THEREOF

(71) Applicant: Telenav, Inc., Sunnyvale, CA (US)

(72) Inventors: Feng Guo, Redwood City, CA (US); Leqing Zhou, San Jose, CA (US); Arvind R Taranath, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/211,482

(22) Filed: Mar. 14, 2014

(65) Prior Publication Data

US 2015/0264183 A1 Sep. 17, 2015

(51) Int. Cl.
*H04M 3/56* (2006.01)

(52) U.S. Cl.
CPC .................................... *H04M 3/56* (2013.01)

(58) Field of Classification Search
CPC ........ H04M 3/56; H04M 3/563; H04M 3/567; H04M 2203/5062; H04M 2203/5009
USPC ....................................... 379/202.01, 207.02
See application file for complete search history.

(56) References Cited

U.S. PATENT DOCUMENTS

| | | | |
|---|---|---|---|
| 6,975,997 B1 | 12/2005 | Murakami et al. | |
| 7,974,771 B2 | 7/2011 | Cobbold | |
| 8,139,514 B2 | 3/2012 | Weber et al. | |
| 8,346,864 B1 * | 1/2013 | Amidon | H04L 65/1069 709/204 |
| 8,660,781 B2 | 2/2014 | Cobbold | |
| 2003/0100326 A1 * | 5/2003 | Grube | H04W 84/08 455/515 |
| 2005/0069115 A1 * | 3/2005 | McKnight | H04M 3/56 379/202.01 |
| 2008/0253548 A1 * | 10/2008 | Mahalingam | H04M 3/56 379/202.01 |
| 2011/0135082 A1 * | 6/2011 | Lingafelt et al. | 379/203.01 |
| 2012/0128147 A1 * | 5/2012 | Callanan et al. | 379/207.02 |
| 2012/0166972 A1 | 6/2012 | Weber et al. | |

* cited by examiner

*Primary Examiner* — Ahmad F. Matar
*Assistant Examiner* — Jirapon Intavong
(74) *Attorney, Agent, or Firm* — Perspectives Law Group, Corp.

(57) ABSTRACT

An electronic system includes: a communication unit configured to provide a conference bridge; a storage unit, coupled to the communication unit, configured to implement a code for the conference bridge; a control unit, coupled to the storage unit, configured to: determine a security setting for the conference bridge; and disconnect a connection from the conference bridge based on the security setting.

20 Claims, 7 Drawing Sheets

ELECTRONIC SYSTEM WITH GROUP LOCATION MECHANISM AND METHOD OF OPERATION THEREOF

TECHNICAL FIELD

An embodiment of the present invention relates generally to an electronic system, and more particularly to a system for location.

BACKGROUND

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take many different directions.

One area of consumer electronics growth, where mobility is essential, is in location based services such as navigation systems utilizing satellite-based Global Positioning System (GPS) devices. One such use of location based services is to efficiently transfer or route users to a user defined destination or service.

Navigation systems and location based services enabled systems have been incorporated in automobiles, notebooks, handheld devices, and other portable products. These systems aid users by incorporating available, real-time relevant information, such as maps, directions, local businesses, or other points of interest. The real-time information provides invaluable relevant information, when available or in service areas. The relevant information is also invaluable when service is not available, as well.

One feature of current personal navigation devices is the display of navigation information on a screen, such as location co-ordinates of the device, speed of the device; and direction of movement of the device. Navigation information can be displayed in any number of ways though most users choose a map mode with a map displayed on the screen of the personal navigation device that indicates the location of the device on the map.

Thus, a need still remains for an electronic system with group location mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a communication unit configured to provide a conference bridge; a storage unit, coupled to the communication unit, configured to implement a code for the conference bridge; a control unit, coupled to the storage unit, configured to: determine a security setting for the conference bridge; and disconnect a connection from the conference bridge based on the security setting.

An embodiment of the present invention provides a method of operation of an electronic system, including: providing a conference bridge; implementing a code for the conference bridge; determining, with a control unit, a security setting for the conference bridge; and disconnecting a connection from the conference bridge based on the security setting.

An embodiment of the present invention provides a non-transitory computer readable medium including stored thereon instructions to be executed by a control unit including: providing a conference bridge; implementing a code for the conference bridge; determining a security setting for the conference bridge; disconnecting a connection from the conference bridge based on the security setting.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

In an exemplary embodiment, a group of users can join a "drive session" to a common destination. Participants of the same "drive session" share their whereabouts, and are able to view other participants' estimated time of arrival (ETA) and whereabouts in their travel to the common destination. Participants can control user preferences, user security, and participation of others.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
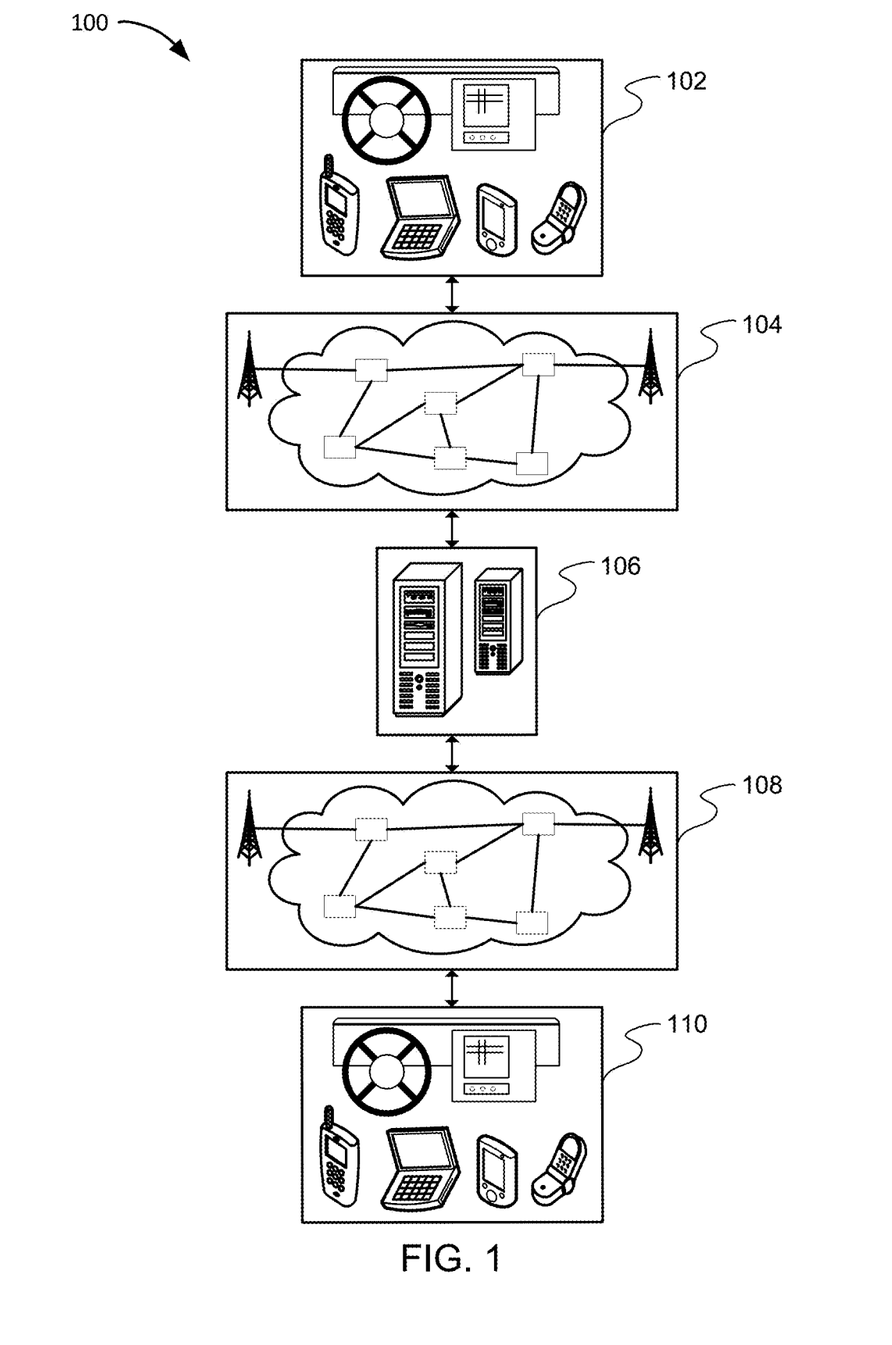
FIG. 1 is an electronic system with group location mechanism in an exemplary embodiment of the present invention.

Referring now to FIG. 1, therein is shown an electronic system 100 with group location mechanism in an exemplary embodiment of the present invention. The electronic system 100 includes a first device 102, such as a client or a server, connected to a second device 106, such as a client or server, and connected to a third device 110, such as a client or a server. The first device 102 can communicate with the second device 106, the third device 110, or combination thereof, with a communication path 104, such as a wireless or wired network, the communication path 108 such as a wireless or wired network, or combination thereof.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 or the communication path 108 to communicate with the second device 106, the third device 110, or combination thereof, or can be a stand-alone device.

For illustrative purposes, the electronic system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

Similarly, the third device 110 can be of any of a variety of display devices, such as a cellular phone, personal digital assistant, a notebook computer, a liquid crystal display (LCD) system, a light emitting diode (LED) system, or other multi-functional display or entertainment device. The third device 110 can couple, either directly or indirectly, to the communication path 104 or the communication path 108 to communicate with the second device 106, the third device 110, or combination thereof, or can be a stand-alone device.

For illustrative purposes, the electronic system 100 is described with the third device 110 as a display device, although it is understood that the third device 110 can be different types of devices. For example, the third device 110 can also be a device for presenting images or a multi-media presentation. A multi-media presentation can be a presentation including sound, a sequence of streaming images or a video feed, or a combination thereof. As an example, the third device 110 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 or the communication path 108 to communicate with the first device 102, the third device 110, or combination thereof.

For illustrative purposes, the electronic system 100 is described with the second device 106 as a computing device, although it is understood that the second device 106 can be different types of devices. Also for illustrative purposes, the electronic system 100 is shown with the second device 106, the third device 110, and the first device 102 as end points of the communication path 104 or the communication path 108, although it is understood that the electronic system 100 can have a different partition between the first device 102, the second device 106, the third device 110, the communication path 104, and the communication path 108. For example, the first device 102, the second device 106, the third device 110, or a combination thereof can also function as part of the communication path 104 or the communication path 108.

The communication path 104 and the communication path 108 can span and represent a variety of networks. The communication path 104 and the communication path 108 can also represent the same network. For example, the communication path 104 and the communication path 108 can include wireless communication, wired communication, optical, ultrasonic, or the combination thereof.

Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104 and the communication path 108. Ethernet, digital subscriber line (DSL), fiber to the home (FTTH), and plain old telephone service (POTS) are examples of wired communication that can be included in the communication path 104 and the communication path 108.

Further, the communication path 104 and the communication path 108 can traverse a number of network topologies and distances. For example, the communication path 104 and the communication path 108 can include direct connection, personal area network (PAN), local area network (LAN), metropolitan area network (MAN), wide area network (WAN), or a combination thereof.

Figure 2:
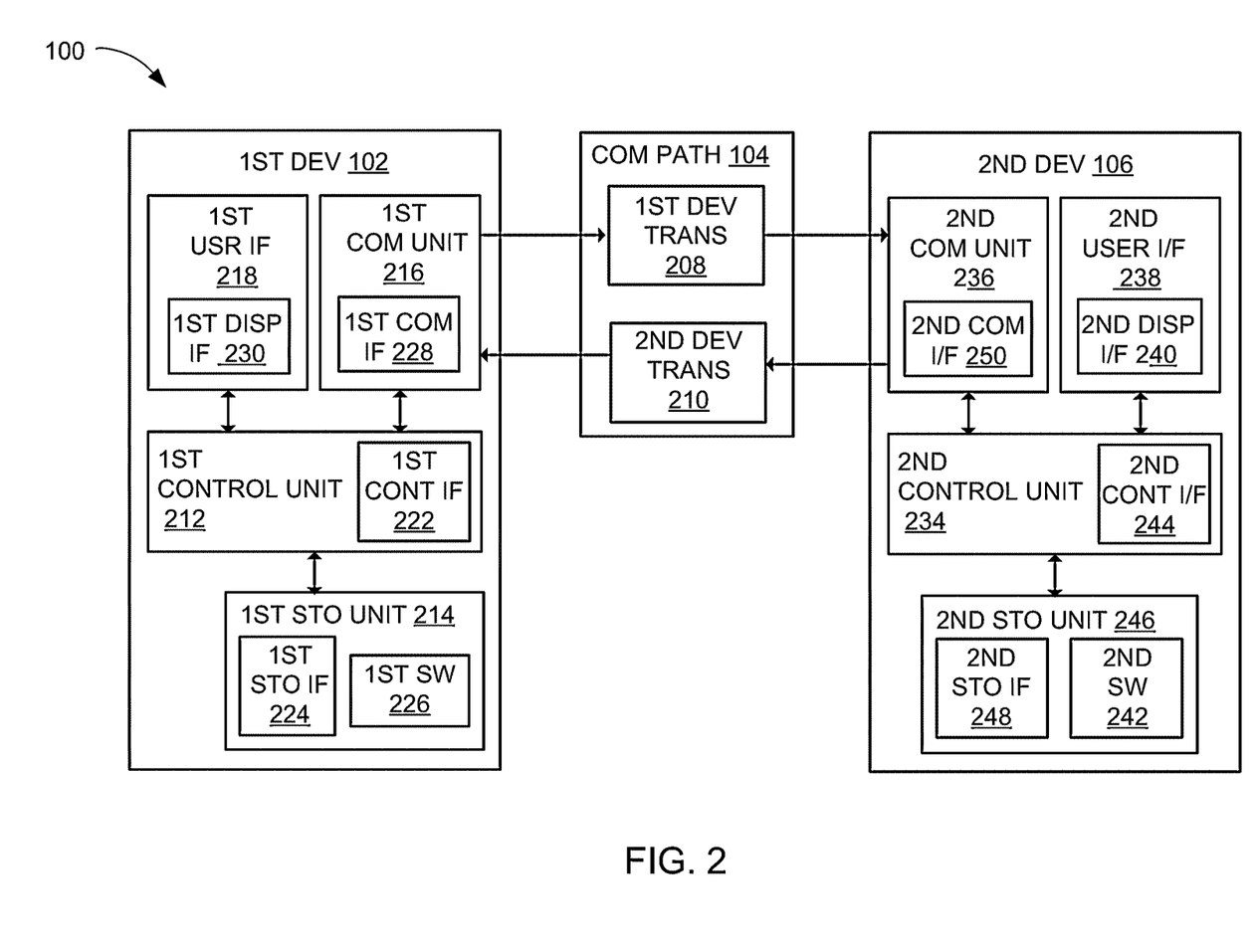
FIG. 2 is an exemplary block diagram of the electronic system.

Referring now to FIG. 2, therein is shown an exemplary block diagram of the electronic system 100. The electronic system 100 can include the first device 102, the communication path 104, the communication path 108, the second device 106, and the third device 110 of FIG. 1. The first device 102 can send information in a first device transmission 208 over the communication path 104 or the communication path 108 to the second device 106, the third device 110, or combination thereof. The second device 106 can send information in a second device transmission 210 over the communication path 104 or the communication path 108 to the first device 102, the third device 110, or combination thereof.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

Further for illustrative purposes, the electronic system 100 is shown with the third device 110 as a client device, although it is understood that the electronic system 100 can have the third device 110 as a different type of device. For example, the third device 110 can be a server having a display interface.

For brevity of description in this exemplary embodiment of the present invention, the first device 102 will be described as a client device, the second device 106 will be described as a server device, and the third device 110 will be described as a client device such as the first device 102. This exemplary embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the electronic system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102, the third device 110, or combination thereof. The first control interface 222 can also be used for communication that is external to the first device 102, the third device 110, or combination thereof.

The first control interface 222 can receive information from the other functional units or from external sources, or can transmit information to the other functional units or to external destinations. The external sources and the external destinations refer to sources and destinations external to the first device 102, the third device 110, or combination thereof.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102, the third device 110, or combination thereof. The first storage interface 224 can also be used for communication that is external to the first device 102, the third device 110, or combination thereof.

The first storage interface 224 can receive information from the other functional units or from external sources, or can transmit information to the other functional units or to external destinations. The external sources and the external destinations refer to sources and destinations external to the first device 102, the third device 110, or combination thereof.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102, the third device 110, or combination thereof. For example, the first communication unit 216 can permit the first device 102, the third device 110, or combination thereof, to communicate with the second device 106 of FIG. 1, an attachment, such as a peripheral device or a computer desktop, the communication path 104, and the communication path 108.

The first communication unit 216 can also function as a communication hub allowing the first device 102, the third device 110, or combination thereof, to function as part of the communication path 104, the communication path 108, or combination thereof, and not limited to be an end point or terminal unit to the communication path 104. The first communication unit 216 can include active and passive components, such as microelectronics or an antenna, for interaction with the communication path 104 or the communication path 108.

The first communication unit 216 can include a first communication interface 228. The first communication interface 228 can be used for communication between the first communication unit 216 and other functional units in the first device 102, the third device 110, or combination thereof. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102, the third device 110, or combination thereof. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100. The first control unit 212 can further execute the first software 226 for interaction with the communication path 104 and the communication path 108 via the first communication unit 216.

The second device 106 can be optimized for implementing an embodiment of the present invention in a multiple device embodiment with the first device 102, the third device 110, or combination thereof. The second device 106 can provide the additional or higher performance processing power compared to the first device 102, the third device 110, or combination thereof. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102, the third device 110, or combination thereof, over the communication path 104 or the communication path 108.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102, the third device 110, or combination thereof, over the communication path 104, the communication path 108, or combination thereof.

The second communication unit 236 can also function as a communication hub allowing the second device 106 to function as part of the communication path 104, the communication path 108, or combination thereof, and not limited to be an end point or terminal unit to the communication path 104 or the communication path 108. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104, the communication path 108, or combination thereof, to send information to the second device 106 in the first device transmission 208. The second device 106 can receive information in the second communication unit 236 from the first device transmission 208 of the communication path 104 or the communication path 108.

The second communication unit 236 can couple with the communication path 104, the communication path 108, or combination thereof, to send information to the first device 102, the third device 110, or combination thereof, in the second device transmission 210. The first device 102, the third device 110, or combination thereof, can receive information in the first communication unit 216 from the second device transmission 210 of the communication path 104 or the communication path 108. The electronic system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102, the third device 110, or combination thereof, can work individually and independently of the other functional units. The first device 102, the third device 110, or combination thereof, can work individually and independently from the second device 106 and the communication path 104, the communication path 108, or combination thereof.

The functional units in the second device 106 can work individually and independently of the other functional units. The second device 106 can work individually and independently from the first device 102, the third device 110, or combination thereof, and the communication path 104, the communication path 108, or combination thereof.

For illustrative purposes, the electronic system 100 is described by operation of the first device 102, the second device 106, and the third device 110. It is understood that the first device 102, the second device 106, and the third device 110 can operate any of the modules and functions of the electronic system 100.

Figure 3:
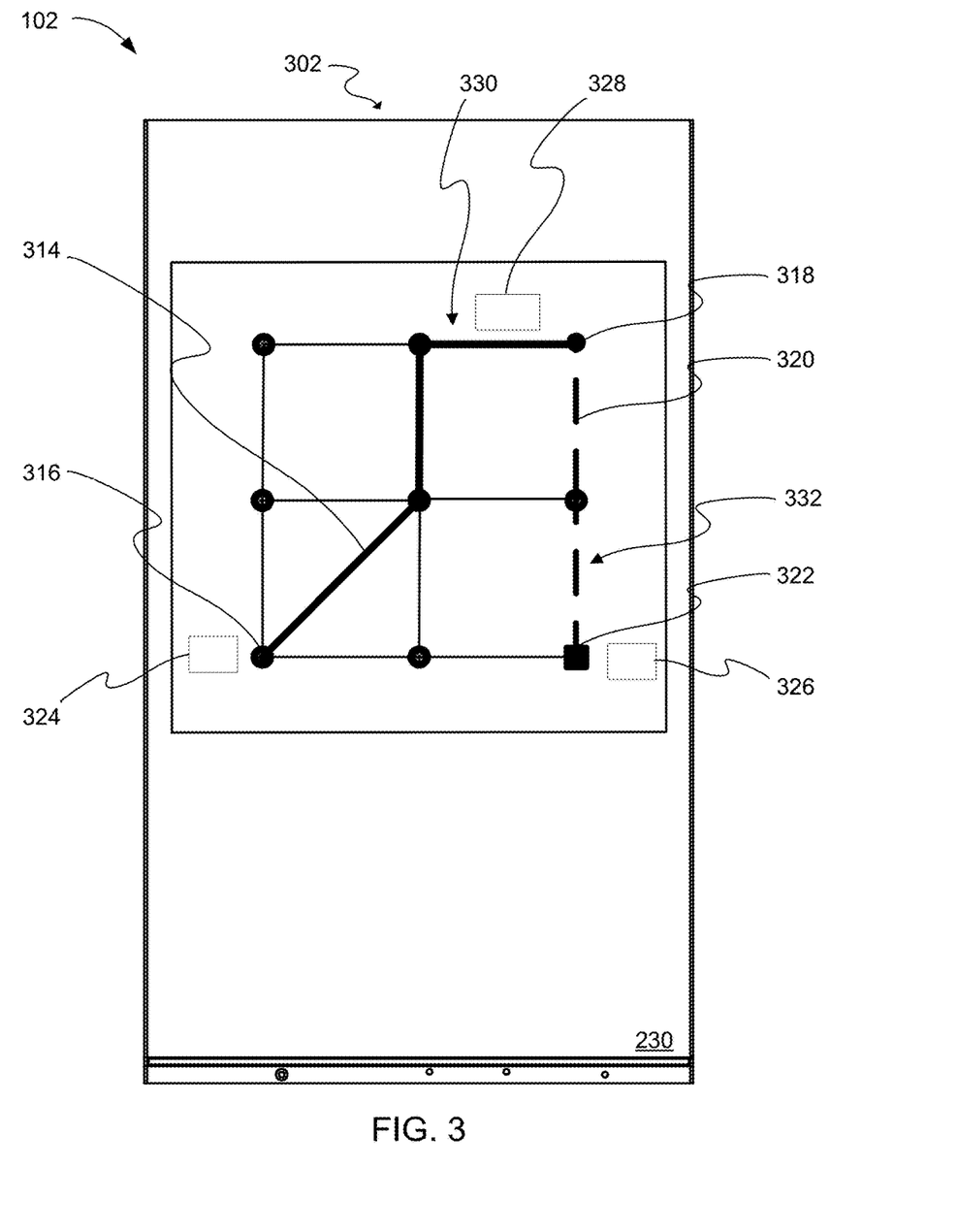
FIG. 3 is an exemplary display interface of a location sharing session of the electronic system.

Referring now to FIG. 3, therein is shown an exemplary display interface of a location sharing session 302 of the electronic system 100. The electronic system 100 can include the first device 102 of FIG. 1 with the first display interface 230. The location sharing session 302 can depict a first route 314 between a first location 316, representing the location of the first device 102, and a user defined destination 318. The location sharing session 302 can display a second route 320 between a second location 322, representing the location of another device, such as the second device 106 of FIG. 1, the third device 110 of FIG. 1 or combination thereof, and the user defined destination 318. The location sharing session 302 can also display a third route (not shown) representing the location of the third device 110 and the user defined destination 318.

The first route 314 is preferably displayed so that it has a first line characteristic 330 that is different from a second line characteristic 332 of the second route 320. The first line characteristic 330 and the second line characteristic 332 can include line density, line thickness, line brightness, or line color. The first route 314, the first location 316, the second route 320, and the second location 322 can be determined in real time or at predetermined intervals.

For example, the first route 314 can be displayed as having the first line characteristic 330 of a solid line, a thick line, a bright line or a brightly colored line, while the second route 320 can be displayed as having the second line characteristic 332 of a dotted line, a thin line, a dark lightly or a darkly colored line. For illustrative purposes the first route 314 and the second route 320 are shown on a grid; although it is understood that the first route 314 and the second route 320 can be displayed with any number of visual representations, including street level maps, topographical maps, satellite images, any screen image, or combination thereof.

The location sharing session 302 can also depict a first estimated time of arrival 324, a second estimated time of arrival 326, a third estimated time of arrival (not shown), or combination thereof, indicating the estimated times of arrival of the first device 102, the second device 106, the third device 110, or combination thereof, respectively. The first estimated time of arrival 324, the second estimated time of arrival 326, and the third estimated time of arrival can include, for example, the estimated times of arrival of each device, the amount of time left before the devices arrive at the user defined destination 318 or the distance of each device from the user defined destination 318. The first estimated time of arrival 324 and the second estimated time of arrival 326 can be determined and disclosed in real time or at predetermined intervals.

For illustrative purposes, the first estimated time of arrival 324 and the second estimated time of arrival 326 are shown on the first display interface 230 next to the first location 316 and the second location 322 respectively. Although it is understood that the first estimated time of arrival 324, the second estimated time of arrival 326, the third estimated time of arrival can be displayed anywhere on the first display interface 230. Furthermore, it is understood that the first estimated time of arrival 324, the second estimated time of arrival 326, and the third estimated time of arrival need not be displayed in the location sharing session 302, but can take the form of an audio announcement.

The location sharing session 302 can also depict a reminder 328. The reminder 328 can be displayed whenever an event occurs and can convey a variety of information related to that event. For example the reminder 328 can be displayed when an event occurs such as a change in the estimated arrival or the speed of the first device 102 or the second device 106, the arrival of the first device 102 or the second device 106 at the user defined destination 318, the arrival of the first device 102 or the second device 106 within a preselected distance of the user defined destination 318, or a change in the user defined destination 318.

It is understood that the routes, waypoints, estimated times of arrival, reminders, and other relevant information depicted as being displayed on the first display interface 230 of the first device 102 can be displayed on another device, such as the third device 110, with which the first device 102 is sharing relevant information. The third device 110, the second device 106, or combination thereof, can be the other device or other devices and can display the shared relevant information at the same time that it is being displayed on the first device 102.

It has been discovered that the electronic system 100 with the location sharing session 302 depicting the first estimated time of arrival 324 of the first device, the second estimated time of arrival 326 of the second device 106, the third estimated time of arrival of the third device 110, or combination thereof, provides tracking of multiple devices and multiple routes on a single display. Information, such as tracking and estimated time of arrival, for the multiple routes, such as the first route 314, the second route 320, and the third route can be distinctly displayed, such as the first line characteristic 330 or the second line characteristic 332, distinguished with an audio announcement, or combination thereof.

Figure 4:
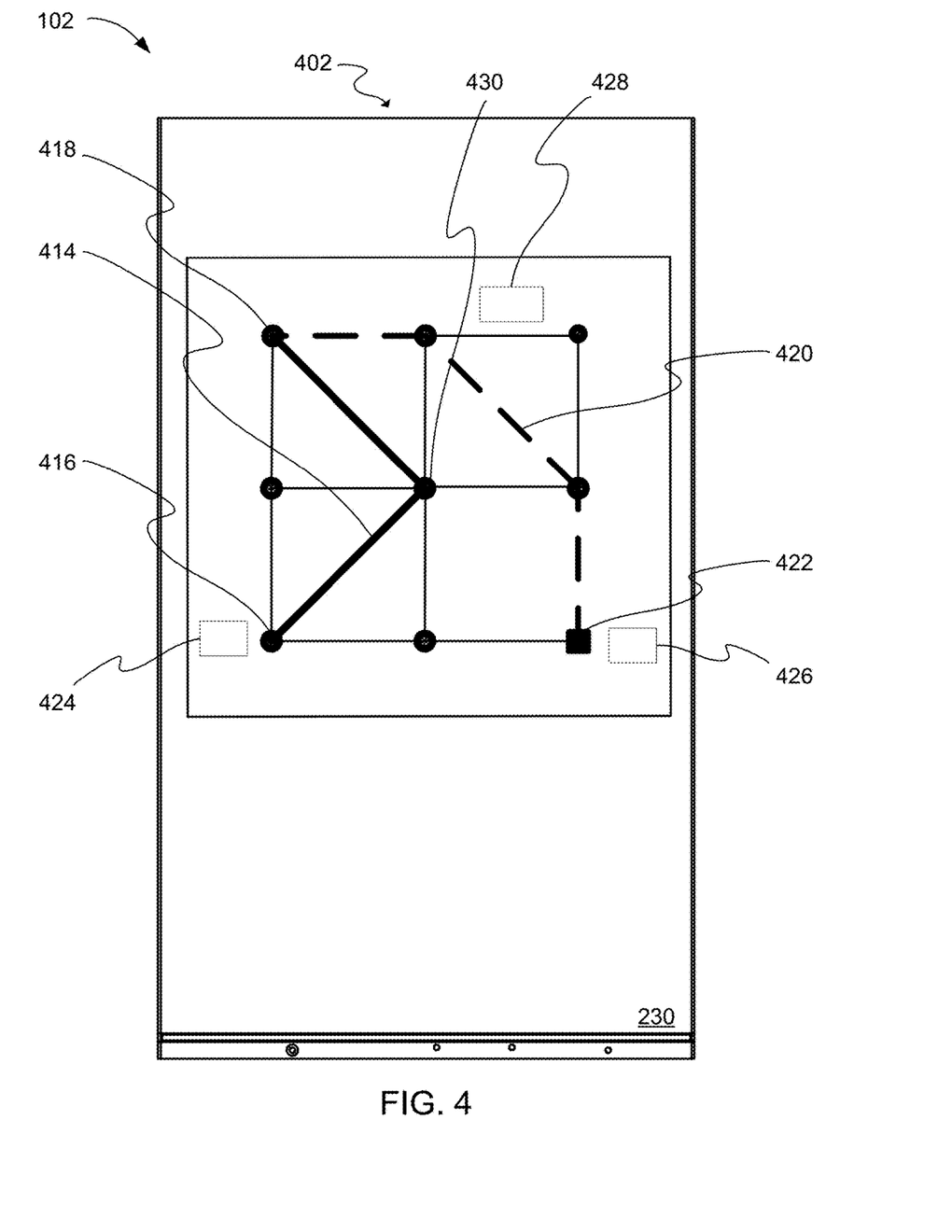
FIG. 4 is an exemplary display interface of a location sharing session of the electronic system.

Referring now to FIG. 4, therein is shown an exemplary display interface of a location sharing session 402 of the electronic system 100. The electronic system 100 can include the first device 102 of FIG. 1 with the first display interface 230. The first display interface 230 of the first device 102 can display a revised user defined destination 418 and a waypoint 430 inserted into the first route 314 of FIG. 3. The revised user defined destination 418, the waypoint 430, or combination thereof, can be provided by the first device 102, the second device 106 of FIG. 1, the third device 110 of FIG. 1, or combination thereof.

The location sharing session 402 can display a first revised route 414 between a first location 416, the waypoint 430, and the revised user defined destination 418. The first revised route 414 reflects a change in the first route 314 based on both the selection and reception of the revised user defined destination 418 and the reception and insertion of the waypoint 430 into the first route 314.

The first revised route 414 can be generated with only reception and insertion of the waypoint 430, with only selection and reception of the revised user defined destination 418, or combination thereof. The first revised route 414 can also be generated by changing the location of the waypoint 430 or by removing the waypoint 430 particularly if the waypoint 430 was already received and inserted into the first route 314. Further, the electronic system 100 can receive the waypoint 430 inserted into a route, such as the second route 320 of FIG. 3, by the second device 106, the third device 110, or combination thereof.

The location sharing session 402 can also display a second revised route 420 between a second location 422 and the revised user defined destination 418. The second revised route 420 can be displayed reflecting the selection and reception of the revised user defined destination 418, the reception and insertion of the waypoint 430 into a route, such as the second route 320, or combination thereof.

The second revised route 420 is preferably displayed with a line characteristic distinguished from a line characteristic of the first revised route 414. For example, the first revised route 414 can be displayed with a solid line, a thick line, a bright line or a brightly colored line, and the second revised route 420 can be displayed with a dotted line, a thin line, a dark lightly, or a darkly colored line.

The location sharing session 402 can display a first estimated time of arrival 424, a second estimated time of arrival 426, a third estimated time of arrival (not shown), or combination thereof, indicating the estimated times of arrival of the first device 102, the second device 106, the third device 110, respectively. The first estimated time of arrival 424, the second estimated time of arrival 426, the third estimated time of arrival, or combination thereof, can include the estimated times of arrival of each device, the amount of time left before each of the devices arrives at the revised user defined destination 418, the distance each device is from the revised user defined destination 418, or combination thereof. The first estimated time of arrival 424, the second estimated time of arrival 426, the third estimated time of arrival, or combination thereof, can be determined and disclosed in real time or at predetermined intervals.

For illustrative purposes, the first estimated time of arrival 424 and the second estimated time of arrival 426 are shown on the first display interface 230 next to the first location 416 and the second location 422 respectively, although, it is understood that the first estimated time of arrival 424 and the second estimated time of arrival 426 can be displayed anywhere on the first display interface 230. Further, it is understood that the first estimated time of arrival 424, the second estimated time of arrival 426, the third estimated time of arrival, or combination thereof, need not be displayed in the location sharing session 402, and can be delivered as an audio announcement.

The location sharing session 402 can also depict a reminder 428. The reminder 428 can be displayed before an event occurs, when an event occurs, or combination thereof. The reminder 428 can convey any information related to an event. For example the reminder 428 can be displayed before an event occurs including information such as a change in an estimated arrival time, a speed of the first device 102, the second device 106, the third device 110, or combination thereof, arrival of the first device 102, the second device 106, the third device, or combination thereof, or combination thereof. Further for example, the reminder 428 can include information based on the revised user defined destination 418, within a preselected distance of the revised user defined destination 418, the reception or selection of the waypoint 430, the reception or selection of the revised user defined destination 418, or combination thereof.

It has been discovered that the electronic system 100 provides selection of a new destination, such as the revised user defined destination 418, or insertion of additional waypoints, such as the waypoint 430, into a route, and can provide updated locations, routes and estimated times of arrivals based on this new information. The routes, waypoints, estimated times of arrival, reminders, and other relevant information can be displayed in the location sharing session 402 or provided as an audio announcement.

It has further been discovered that the electronic system 100 provides coordination and monitoring of multiple users travelling to a shared destination on a single device allowing changes or modifications to shared routes during navigation. The selection of a new shared destination or insertion of additional waypoints into a route can provide revised routes and estimated times of arrivals for multiple devices in real time.

Figure 5:
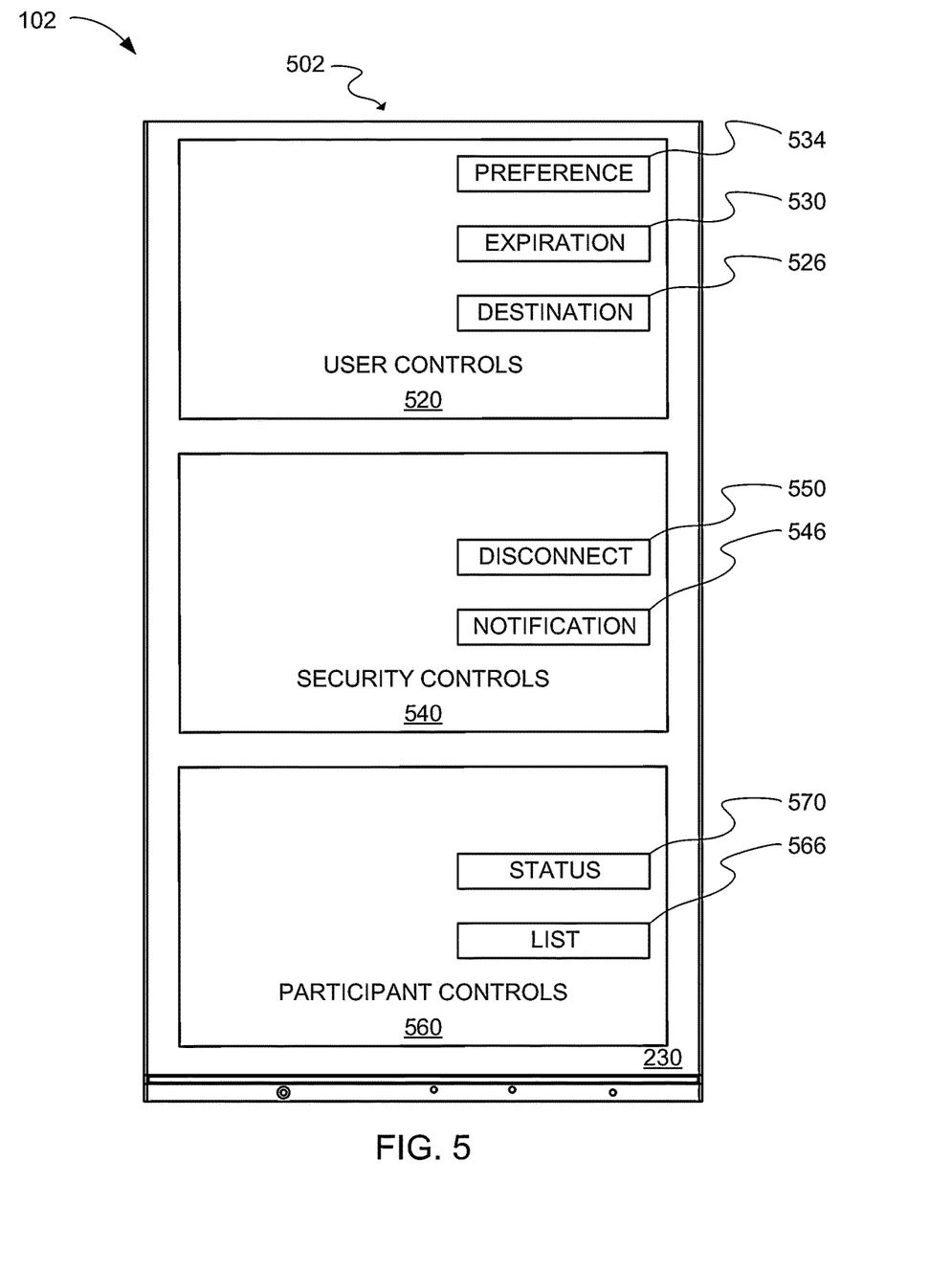
FIG. 5 is an exemplary display interface of a location sharing session of the electronic system.

Referring now to FIG. 5, therein is shown an exemplary display interface of a location sharing session 502 of the electronic system 100. The electronic system 100 can include the first device 102 of FIG. 1 with the first display interface 230 and the location sharing session 502. The location sharing session 502 can display user controls 520, security controls 540, participant controls 560, or combination thereof, for location sharing sessions.

For illustrative purposes, the location sharing session 502 is shown with location sharing information although it is understood that any information can be displayed singly or in combination. Any other information can be displayed such as the user defined destination 318, the first route 314 of FIG. 3, the first location 316 of FIG. 3, the second route 320 of FIG. 3, the second location 322 of FIG. 3, the first estimated time of arrival 324 of FIG. 3, the second estimated time of arrival 326 of FIG. 3, the revised user defined destination 418 of FIG. 4, the waypoint 430 of FIG. 4, the first location 416 of FIG. 4, the second location 422 of FIG. 4, the first revised route 414 of FIG. 4, the second revised route 420 of FIG. 4, or combination thereof.

The following controls of the location sharing session 502 are exemplary. For illustrative purposes, the controls are shown in particular locations and in particular groups although it is understood that any location, grouping, combination, size, shape, number, type, feature, or configuration, may be used.

The user controls 520 can include settings for a specific destination, a limited amount of time such as auto-expiration, a specific set of participants, any user control, or combination thereof. The user controls 520 of the location sharing session 502 can include a destination control 526 such as a user selection of destinations for user connection to a location sharing session. The location sharing session 502 can also include an expiration control 530, which can be implemented with a timer, auto-expiration logic, or combination thereof, for user connection to a location sharing session. The location sharing session 502 can also include a preference control 534 such as a user selection of preferred participants for user connection to a location sharing session.

The security controls 540 can include unintended participant warning, unintended participant automated disconnect, intended participant code change, one participant disconnecting another participant, at least two participants are required to disconnect another participant, disconnecting a participant by vote such as simple majority, social media criteria, historical criteria such as travel history, preference criteria, calendar distribution, social event participants, media event participants, any other criteria, or combination thereof. The security controls 540 of the location sharing session 502 can include a notification control 546 for notifying or alerting a user that a potentially unintended participant has connected to a location sharing session. The location sharing session 502 can also include a disconnect control 550 for disconnecting or removing a participant from a location sharing session. The disconnect control 550 can also allow a user to immediately stop sharing location information in a location sharing session.

The participant controls 560 can include a list of participants preferably including criteria for participation, security criteria, privileges, required attendee status, optional attendee status, location, participant settings, or combination thereof. The participant controls 560 of the location sharing session 502 can include a list control 566 for a user in a location sharing session. The location sharing session 502 can also include a status control 570 such as a request or vote to disconnect a participant in a location sharing session.

It has been discovered that the electronic system 100 with the user controls 520, security controls 540, participant controls 560, or combination thereof, controls participation in a location sharing session. The location sharing session 502 user control, security, and participation control for a user in a location sharing session.

Figure 6:
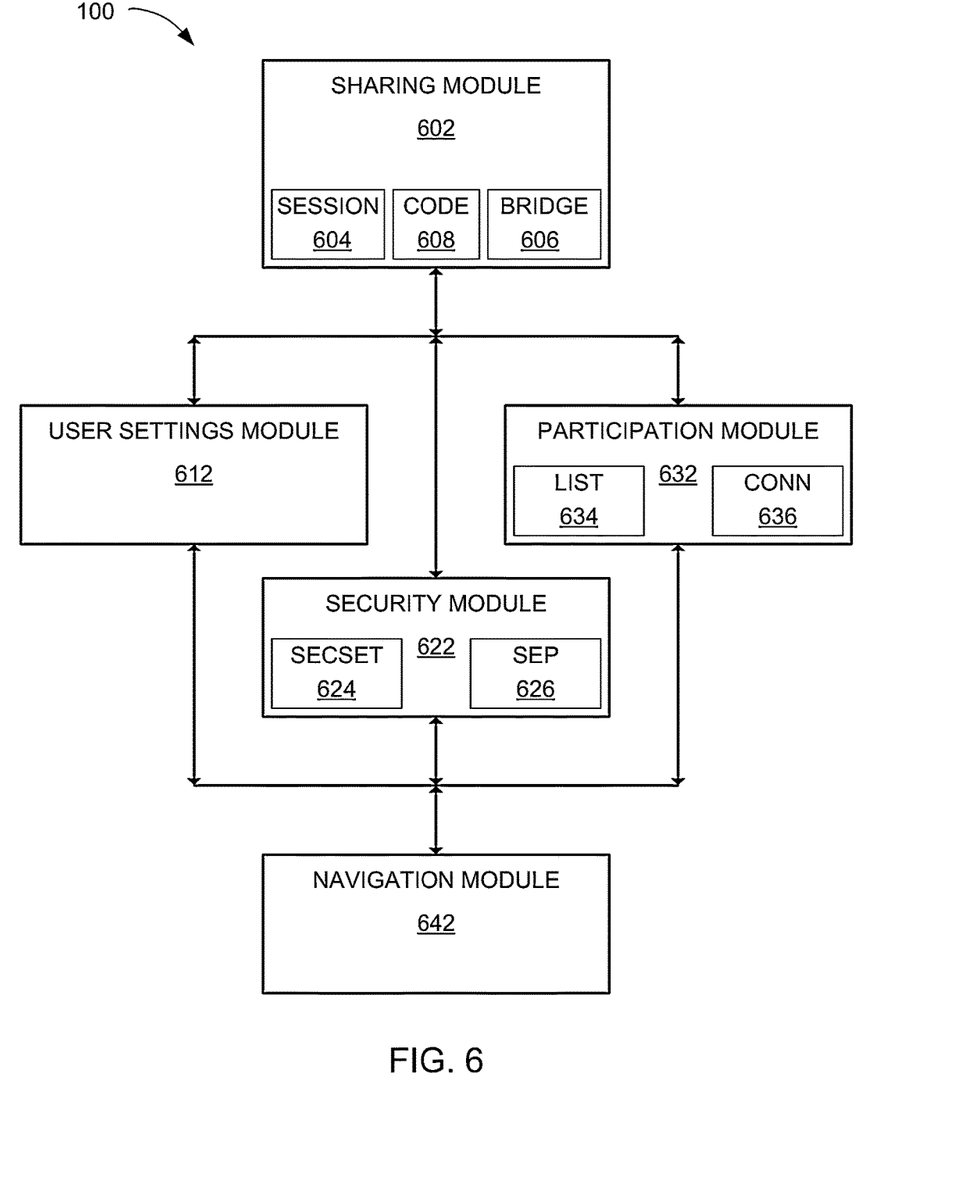
FIG. 6 is a control flow of the electronic system in an exemplary embodiment.

Referring now to FIG. 6, therein is shown a control flow 500 of the electronic system 100 in an exemplary embodiment. The electronic system 100 can include a sharing module 602, a user settings module 612, a security module 622, a participation module 632, a navigation module 642, or combination thereof.

The sharing module 602 can include, provide, determine, calculate, process, store, communicate, display, or combination thereof, a sharing session 604 such as a "drive session", the location sharing session 302 of FIG. 3, the location sharing session 402 of FIG. 4, the location sharing session 502 of FIG. 5, or combination thereof. The sharing session 604 can include a group of users travelling to a same destination such as the user defined destination 318 of FIG. 3, the revised user defined destination 418 of FIG. 4, or combination thereof.

One or more user may want to know about one or more of other users' estimated time of arrival (ETA), such as the first estimated time of arrival 324 of FIG. 3, the second estimated time of arrival 326 of FIG. 3, first estimated time of arrival 424 of FIG. 4, the second estimated time of arrival 426 of FIG. 4, or combination thereof. One or more user may also want to know about one or more of the other users' location such as the first location 316 of FIG. 3, the second location 322 of FIG. 3, the first location 416 of FIG. 4, the second location 422 of FIG. 4, whereabout with respect to the same destination, or combination thereof, or combination thereof.

A common destination such as the user defined destination 318 of FIG. 3, the revised user defined destination 418, or combination thereof, can include a restaurant, a party, a concert, a delivery location with information for both the customer and delivery person, or combination thereof. For example, the customer of the delivery wants to plan availability to sign for the delivery and the delivery person wants to provide travel estimates to the delivery location.

The sharing module 602 can also include, provide, determine, calculate, process, store, communicate, display, or combination thereof, invitations to the sharing session 604 based on history of past travel, user preferences, users listed on a calendar, users listed for a social event, users listed for a media event, or combination thereof. The sharing module 602 can optionally provide automated sharing such as auto turn-on based on calendar information, time based information, privilege information, optional attendees to a meeting, required attendees to a meeting, "on my way home" with a significant other, other information sources, or combination thereof.

The sharing module 602 can include, provide, determine, calculate, process, store, communicate, display, or combination thereof, a conference bridge 606. The conference bridge 606 can be implemented by a "dial-in and dial-out" mechanism. One or more users can join the sharing session 604 of the sharing module 602 to share their location such as their whereabout and can optionally talk to and hear the other users. The sharing session 604 can include one-way sharing such as for a super-user, administrator, parent, any other user, or combination thereof, two-way sharing, any number of sharing, or combination thereof. The sharing session 604 can include both travel information and conference call features with people in a same one of the conference bridge 606 able to talk to and hear each other.

The conference bridge 606 can also include, provide, determine, calculate, process, store, communicate, display, or combination thereof, a group voice chat, an interactive voice response (IVR), a video conference, gaming, shared movies, or combination thereof. Services of the conference bridge 606 can be hosted by a device such as the first device 102 of FIG. 1, the second device 106 of FIG. 1, the third device 110 of FIG. 1, a Telenav server, or combination thereof.

Access to the conference bridge 606 can include a sharing code 608 such as a conference code, a bridge code, or combination thereof. The sharing code 608 can preferably be shared by all users sharing the common destination. The sharing code 608 can optionally include a host or administrative code, although none need be required.

The sharing module 602 can be coupled to the user settings module 612, the security module 622, the participation module 632, the navigation module 642, or combination thereof. The sharing module 602 can be implemented with the first communication unit 216, the second communication unit 236, the first user interface 218, the second user interface 238, the first control unit 212, the second control unit 234, the first storage unit 214, the second storage unit 246, or combination thereof.

The user settings module 612 can include, provide, determine, calculate, process, store, communicate, display, or combination thereof, location tracking or sharing settings including the user controls 520 of FIG. 5. The settings can include a specific destination including the destination control 526 of FIG. 5, sharing for a limited amount of time including the expiration control 530 of FIG. 5 such as auto-expiration logic, sharing while active with automatic expiration after period of inactivity including the expiration control 530, sharing for specific people including the preference control 534 of FIG. 5, or combination thereof.

The user settings module 612 can be coupled to the sharing module 602, the security module 622, the participation module 632, the navigation module 642, or combination thereof. The user settings module 612 can be implemented with the first storage unit 214, the second storage unit 246, the first user interface 218, the second user interface 238, the first control unit 212, the second control unit 234, or combination thereof.

The security module 622 can include, provide, determine, calculate, process, store, communicate, display, or combination thereof, disconnection from the conference bridge 606. For example, a user can immediately disconnect or "leave" the sharing session 604 such as a "drive session" to stop sharing information such as the user's location and stop viewing other users' information such as the other users' locations, to protect the user's privacy.

The security module 622 coupled to the sharing module 602 can also change, include, provide, determine, calculate, process, store, communicate, display, or combination thereof, the sharing code 608. For example, the security module 622 coupled to the sharing module 602 can change the sharing code 608, including increasing the number of digits, for intended or authorized users when an unintended user join the sharing session 604.

The security module 622 can also include, provide, determine, calculate, process, store, communicate, display, or combination thereof, a notification of the unintended user such as with the notification control 546 of FIG. 5. The unintended user can be disconnected by the security module 622 such as with a "kick-out" feature, the disconnect control 550 of FIG. 5, or combination thereof. The security module 622 coupled to the sharing module 602, the user settings module 612, or combination thereof, can include security settings 624 such as disconnect settings for the disconnect control 550. The security settings 624 can include one user disconnecting or "kicking out" another user, at least two users are required to disconnect or "kick out" another user, a majority of users required to disconnect or "kick-out" another user, or combination thereof.

The security settings 624 can also provide an automated disconnect or automated "kick out". The security module 622 including the security settings 624 with the automated disconnect can include, provide, determine, calculate, process, store, communicate, display, or combination thereof, a separation 626 such as an extent or degrees of separation for an unintended user or an intended user and another of the user. For example the security module 622 can utilize social networks to determine the separation 626 for the unintended user with overriding or warning features based on social network or social media settings.

The security module 622 can be coupled to the sharing module 602, the user settings module 612, the participation module 632, the navigation module 642, or combination thereof. The security module 622 can be implemented with the first communication unit 216, the second communication unit 236, the first user interface 218, the second user interface 238, the first control unit 212, the second control unit 234, the first storage unit 214, the second storage unit 246, or combination thereof.

The participation module 632 can include a user list 634 with connections 636 for participants in the sharing session 604 including the participants in the conference bridge 606. The user list 634 can also include unintended users connected to the conference bridge 606 and potential users not currently connected to the conference bridge 606. The user list 634 can include user criteria including participation status, invitation status, security criteria, privileges, required attendee status, optional attendee status, location, participant settings, or combination thereof. The user list 634, location, participant settings, or combination thereof be a single list or multiple lists. The multiples lists of the user list 634, location, participant settings, or combination thereof, can be of any combination, arrangement, organization, display configuration, partition, view, or combination thereof.

The participation module 632 coupled to the security module 622 can include, provide, determine, calculate, process, store, communicate, display, or combination thereof, a user list 634 with the connections 636 representing a user or participant. For example, one of the connections 636 representing a user or participant can disconnect or "kicking out" another of the connections 636 representing another of the users or the participants. Further for example, at least two of the connections 636 representing at least two of the users or the participants are required to disconnect or "kick out" another of the connections 636 representing another of the users or the participants. Yet further for example, a vote or a majority of the connections 636 representing a majority of the users or the participants are required to disconnect or "kick-out" another of the connections 636 representing another of the users or the participants.

The participation module 632 coupled to the security module 622 can determine extent or degrees of the separation 626 between the connection 636 representing the user or the participant and another of the connection 636 representing another of the user or participant. For example, the separation 626 between the connection 636 and the another of the connection 636 can represent the extent or the degrees of the separation 626 between one or more of the users or participants and one or more of the another users or the another participants based on social networks, social media, other social information, or combination thereof.

The participation module 632 can be coupled to the sharing module 602, the user settings module 612, the security module 622, the navigation module 642, or combination thereof. The participation module 632 can be implemented with the first storage unit 214, the second storage unit 246, the first communication unit 216, the second communication unit 236, the first user interface 218, the second user interface 238, the first control unit 212, the second control unit 234, or combination thereof.

The navigation module 642 can provide navigation and display information for the sharing session 604 such as the location sharing session 302 of FIG. 2, the location sharing session 402 of FIG. 4, or combination thereof. The navigation module 642 provides including, determining, calculating, processing, storing, communicating, displaying, or combination thereof, for users locations and travel routes.

The navigation module 642 also provides including, determining, calculating, processing, storing, communicating, displaying, or combination thereof, of estimated time of arrival information such as the first estimated time of arrival 324, the second estimated time of arrival 326, the first estimated time of arrival 424, the second estimated time of arrival 426, or combination thereof. The navigation module 642 provides a dynamic display image of physical world locations and transportation features such as roads, highways, paths, parking lots, traffic signs, traffic control lights, landmarks, buildings, other physical features, or combination thereof.

The physical transformation from a display of a location of a device and a travel route results in the movement in the physical world, such as a first device travelling a route. Movement in the physical world results in changes to the display of a sharing session by tracking or estimating travel along the route.

The navigation module 642 can be coupled to the sharing module 602, the user settings module 612, the security module 622, the participation module 632, or combination thereof. The navigation module 642 can be implemented with the first storage unit 214, the second storage unit 246, the first control unit 212, the second control unit 234, the first user interface 218, the second user interface 238, or combination thereof.

It has been discovered that the electronic system 100 with the security module 622 coupled to the sharing module 602, the user settings module 612, the participation module 632, the navigation module 642, or combination thereof, provides disconnection of unintended users. The security module 622 with the disconnect or "kick out" can include unlimited configurations such as manual, automated, votes, number of users, extent of separation, other configurations, or combination thereof.

Figure 7:
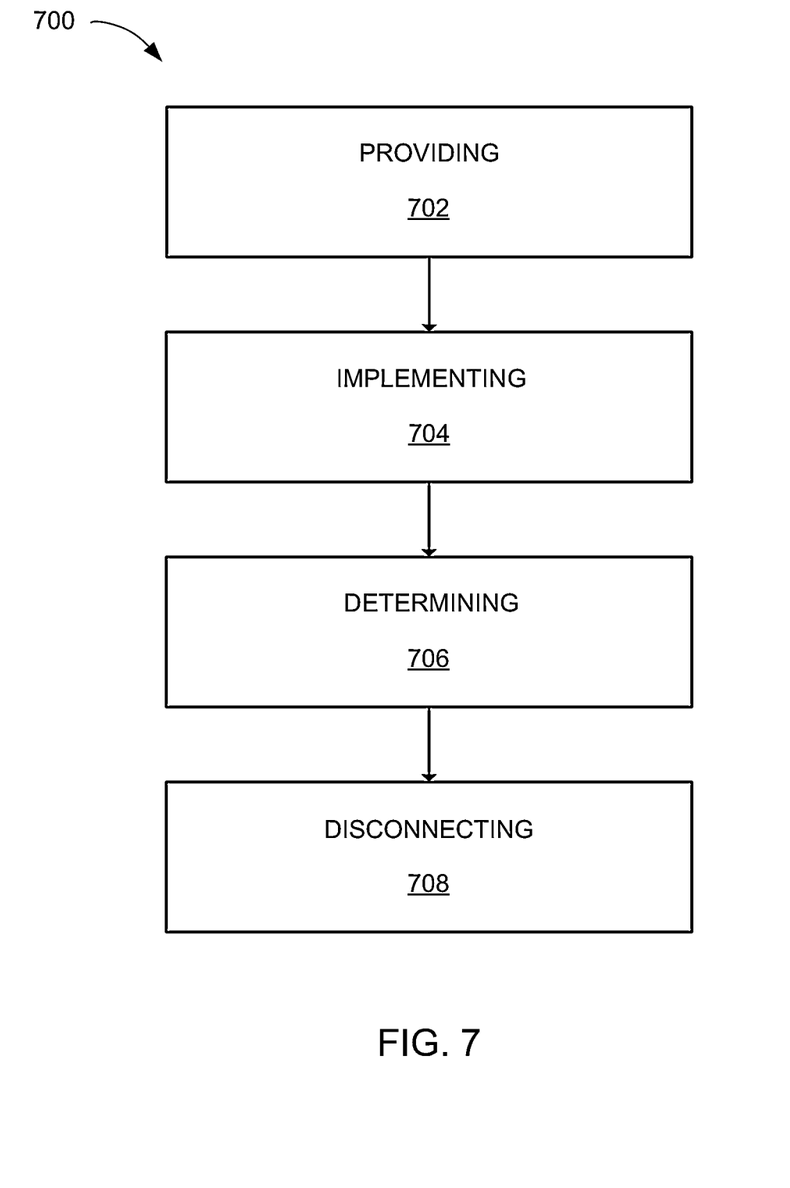
FIG. 7 is a flow chart of a method of operation of an electronic system in an embodiment of the present invention.

Referring now to FIG. 7, therein is shown a flow chart of a method 700 of operation of an electronic system 100 in an embodiment of the present invention. The method 700 includes: providing a conference bridge in a block 702; implementing a code for the conference bridge in a block 704; determining, with a control unit, a security setting for the conference bridge in a block 706; and disconnecting a connection from the conference bridge based on the security setting in a block 708.

The modules described in this application can be implemented as instructions stored on a non-transitory computer readable medium to be executed by a first control unit 212 of FIG. 2, the second control unit 234 of FIG. 2, or a combination thereof. The non-transitory computer readable medium can include the first storage unit 214 of FIG. 2, the second storage unit 246 of FIG. 2, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

The modules described in this application can be part of the first software 226 of FIG. 2, the second software 242 of FIG. 2, or a combination thereof. These modules can also be stored in the first storage unit 214, the second storage unit 246, or a combination thereof. The first control unit 212, the second control unit 234, or a combination thereof can execute these modules for operating the electronic system 100.

The electronic system 100 has been described with module functions or order as an example. The electronic system 100 can partition the modules differently or order the modules differently. For example, the security module 622 of FIG. 6 can be implemented based on input such as information from the navigation module 642 of FIG. 6. Further for example, the participation module 632 can be implemented based on input such as information from the user settings module 612 of FIG. 6.

The electronic system 100 has been described with module functions or order as an example. The electronic system 100 can partition the modules differently or order the modules differently. For example, the sharing module 602 of FIG. 6 can include the user settings module 612, the security module 622, and the participation module 632 of FIG. 6 as separate modules although these modules can be combined into one. Also, the security module 622 can be split into separate modules for implementing in the separate modules implementing the security settings 624 of FIG. 6 and determining the separation 626 of FIG. 6. Similarly the sharing module 602 can be split into separate modules for each module implement the sharing session 604 of FIG. 6 or setting the sharing code 608 of FIG. 6.

The modules described in this application can be hardware implementation, hardware circuitry, or hardware accelerators in the first control unit 212 of FIG. 2 or in the second control unit 234 of FIG. 2. The modules can also be hardware implementation, hardware circuitry, or hardware accelerators within the first device 102 of FIG. 1 or the second device 106 of FIG. 1 but outside of the first control unit 212 or the second control unit 234, respectively.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a communication unit configured to provide a conference bridge;
a storage unit, coupled to the communication unit, configured to store a sharing code for the conference bridge;
a control unit, coupled to the storage unit, configured to:
determine a security setting for the conference bridge;
display a location sharing session executed through the conference bridge including multiple devices, a destination address, and multiple travel routes,
change the sharing code based on the security setting when an unintended user joins the location sharing session including increasing a number of digits of the sharing code and notify the expected participants of the change to the sharing code; and
disconnect a connection of the unintended user from the conference bridge, by disconnecting a device of the unintended user from the location sharing session, based on the security setting including social network or social media settings.

2. The system as claimed in claim 1 wherein the control unit is configured to determine another of the connection can disconnect the connection.

3. The system as claimed in claim 1 wherein the control unit is configured to determine at least two other of the connection are required to disconnect the connection.

4. The system as claimed in claim 1 wherein the control unit is configured to determine a vote of others of the connection can disconnect the connection.

5. The system as claimed in claim 1 wherein the control unit is configured to determine automated disconnect of the connection.

6. The system as claimed in claim 1 wherein the control unit is configured to determine a separation between the connection and another of the connection.

7. The system as claimed in claim 1 wherein the storage unit is configured to change the sharing code to another of the sharing code.

8. A method of operation of an electronic system comprising:
providing a conference bridge;
displaying a location sharing session executed through the conference bridge including multiple devices, a destination address, and multiple travel routes;
implementing a sharing code for the conference bridge;
determining, with a control unit, a security setting for the conference bridge;
changing the sharing code based on the security setting when an unintended user joins the location sharing session including increasing a number of digits of the sharing code and notifying the expected participants of the change to the sharing code; and
disconnecting a connection of the unintended user from the conference bridge, by disconnecting a device of the unintended user from the location sharing session, based on the security setting including social network or social media settings.

9. The method as claimed in claim 8 wherein determining the security setting includes determining another of the connection can disconnect the connection.

10. The method as claimed in claim 8 wherein determining the security setting includes determining at least two other of the connection are required to disconnect the connection.

11. The method as claimed in claim 8 wherein determining the security setting includes determining a vote of others of the connection can disconnect the connection.

12. The method as claimed in claim 8 wherein determining the security setting includes determining automated disconnect of the connection.

13. The method as claimed in claim 8 wherein determining the security setting includes determining a separation between the connection and another of the connection.

14. The method as claimed in claim 8 wherein implementing the sharing code includes changing the sharing code to another of the sharing code.

15. A non-transitory computer readable medium including stored thereon instructions to be executed by a control unit comprising:
providing a conference bridge;
displaying a location sharing session executed through the conference bridge including multiple devices, a destination address, and multiple travel routes;
implementing a sharing code for the conference bridge;
determining a security setting for the conference bridge;
changing the sharing code based on the security setting when an unintended user joins the location sharing session including increasing a number of digits of the sharing code and notifying the expected participants of the change to the sharing code; and
disconnecting a connection of the unintended user from the conference bridge, by disconnecting a device of the unintended user from the location sharing session, based on the security setting including social network or social media settings.

16. The medium as claimed in claim 15 wherein determining the security setting includes determining another of the connection can disconnect the connection.

17. The medium as claimed in claim 15 wherein determining the security setting includes determining at least two other of the connection are required to disconnect the connection.

18. The medium as claimed in claim 15 wherein determining the security setting includes determining a vote of others of the connection can disconnect the connection.

19. The medium as claimed in claim 15 wherein determining the security setting includes determining automated disconnect of the connection.

20. The medium as claimed in claim 15 wherein determining the security setting includes determining a separation between the connection and another of the connection.

\* \* \* \* \*